United States Patent
Tsuzuki et al.

(10) Patent No.: US 7,143,880 B2
(45) Date of Patent: Dec. 5, 2006

(54) TORQUE CONVERTER

(75) Inventors: Yukihisa Tsuzuki, Kariya (JP);
Kuniaki Kuwahara, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 59 days.

(21) Appl. No.: 10/946,395

(22) Filed: Sep. 22, 2004

(65) Prior Publication Data
US 2005/0061596 A1    Mar. 24, 2005

(30) Foreign Application Priority Data
Sep. 24, 2003    (JP) .............................. 2003-331569

(51) Int. Cl.
*F16H 45/02*    (2006.01)
(52) U.S. Cl. .................... 192/3.3; 192/85 AA
(58) Field of Classification Search ...................... None
See application file for complete search history.

(56) References Cited
U.S. PATENT DOCUMENTS

| | | | |
|---|---|---|---|
| 3,224,537 A * | 12/1965 | Hilpert | ................... 192/85 AA |
| 5,533,602 A | 7/1996 | Worner et al. | |
| 6,471,021 B1 * | 10/2002 | Sasse et al. | ................. 192/3.29 |
| 2002/0033310 A1 * | 3/2002 | Sasse et al. | ................. 192/3.29 |
| 2005/0210971 A1 * | 9/2005 | Satoh | ........................ 73/118.1 |

OTHER PUBLICATIONS

T. Kato and H. Michioka, JATCO Trans Technology Ltd.; Y. Mikoshiba and K. Murakami, Nissan Motor Co., Ltd., "Development of Large Capacity 5-speed Automatic Transmission (JR507E) for RWD Vehicles" SAE 2002 World Congress Detroit, Michigan, Mar. 4-7, 2002.

* cited by examiner

*Primary Examiner*—Richard M. Lorence
(74) *Attorney, Agent, or Firm*—Buchanan Ingersoll PC

(57) ABSTRACT

A torque converter includes a front cover connected to an engine with a set block, a pump impeller integrally connected to the front cover, a turbine runner facing to the pump impeller and connected to an input shaft of a transmission, a lock-up clutch for engaging/disengaging the front cover relative to the input shaft through a damper, an engaging hydraulic pressure chamber separated from a power transmission hydraulic chamber surrounded by the pump impeller and the front cover, and that engaging pressure of the lock-up clutch is provided into the engaging hydraulic pressure chamber, a front cover hub, a piston inserted so as to slide in the engaging hydraulic pressure chamber, a clutch engaging portion operated to be engaged/disengaged by the piston, plural projection portions being projecting by stamping and welded to the front cover, and an oil path formed between the front cover and the front cover hub among the projection portions.

22 Claims, 3 Drawing Sheets

TORQUE CONVERTER

CROSS REFERENCE TO RELATED APPLICATIONS

This application is based on and claims priority under 35 U.S.C. § 119 to Japanese Patent Application 2003-331569, filed on Sep. 24, 2003, the entire content of which is incorporated herein by reference.

FIELD OF THE INVENTION

This invention generally relates to a torque converter including a lock-up clutch. More particularly, the present invention pertains to the torque converter whose cost is reduced without lessening virtual function thereof.

BACKGROUND

Generally, a torque converter transmits engine torque to a transmission through fluid, and such fluid usually causes torque transmitting loss due to fluid friction. To avoid such fluid friction loss, a lock-up clutch provided at the torque converter is engaged for transmitting engine torque when a rotation speed of a pump impeller provided at the input side becomes similar to a rotation speed of a turbine runner provided at the output.

Recently, a locked up condition of the clutch has been expanded for improving fuel consumption. Corresponding to such trend, the torque converter also includes an engaging hydraulic pressure chamber (lock up chamber) between a front cover and a front cover hub for improving the lock up engaging accuracy and a durability of the torque converter, and the number of such torque converter having such chamber has been increased.

A known torque converter is disclosed in U.S. Pat. No. 5,533,602 and SAE 2002-01-0935, which includes a front cover hub processed by forging or grinding and an oil path formed by drilling the front cover hub for providing a hydraulic pressure to the engaging hydraulic pressure chamber. The front cover hub is fixed to a front cover by pressing or welding.

The cost of such torque converter having aforementioned configuration has been increased due to the forging or grinding process applied to the front cover hub.

Thus, a need exists for a torque converter to decrease the cost thereof without lessening the virtual function thereof.

SUMMARY OF THE INVENTION

According to an aspect of the present invention, A torque converter comprises a front cover connected to an engine with a set block, a pump impeller integrally connected to the front cover, a turbine runner facing to the pump impeller and connected to an input shaft of a transmission, a lock-up clutch provided inside the front cover to be in line with a torus portion which is comprised of the pump impeller and the turbine runner in axial direction of the input shaft for engaging/disengaging the front cover relative to the input shaft through a damper, an engaging hydraulic pressure chamber separated from a power transmission hydraulic chamber surrounded by the pump impeller and the front cover integrated therewith, and that engaging pressure of the lock-up clutch is provided into the engaging hydraulic pressure chamber, a front cover hub provided between the front cover and the input shaft, a piston provided at the lock-up clutch and inserted so as to slide in the engaging hydraulic pressure chamber, a clutch engaging portion provided at the lock-up clutch and operated to be engaged/disengaged by the piston, plural projection portions provided at the front cover hub, formed to be projecting toward the front cover side by stamping, and welded to the front cover, and an oil path formed between the front cover and the front cover hub among the projection portions.

According to another aspect of the present invention, A torque converter comprises a front cover connected to an engine, a pump impeller provided at the front cover, a turbine runner facing to the pump impeller and connected to an input shaft of a transmission, a lock-up clutch provided inside the front cover for engaging/disengaging the front cover relative to the input shaft through a damper, a front cover hub provided between the front cover and the turbine runner, and forming an engaging hydraulic pressure chamber into which engaging pressure of the lock-up clutch is provided, a piston provided at the lock-up clutch and inserted so as to slide in the engaging hydraulic pressure chamber, a clutch engaging portion provided at the lock-up clutch and operated to be engaged/disengaged by the piston, and plural portions provided at the front cover hub, formed to be projecting toward the front cover side by stamping, and welded to the front cover.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
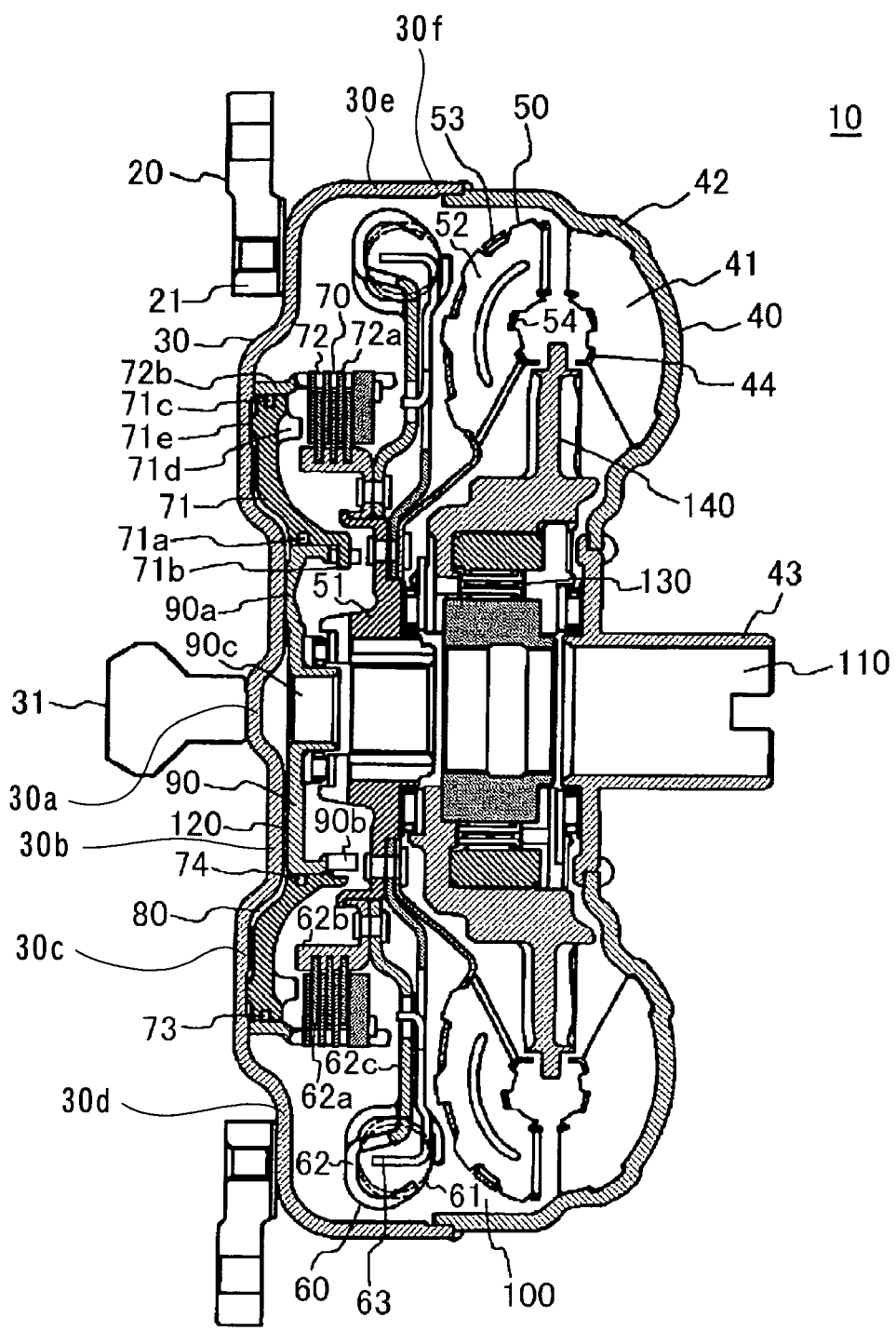
FIG. 1 illustrates a cross section of a pattern diagram of a torque converter according to an embodiment of the present invention.
Figure 2A:
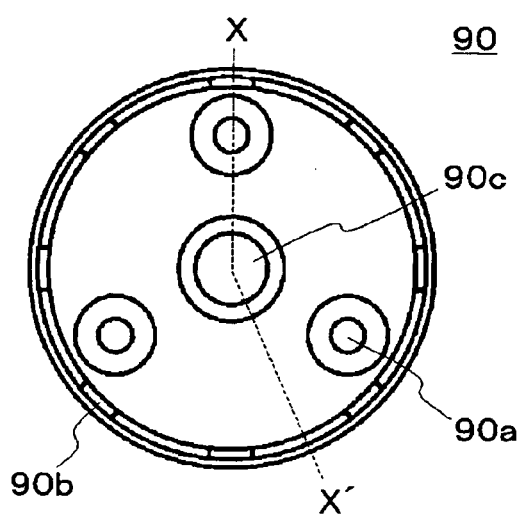
FIG. 2 illustrates a plane view (A) and a cross section along a line X–X' (B) of a pattern diagram of a front cover hub of the torque converter according to the embodiment of the present invention.
Figure 2B:
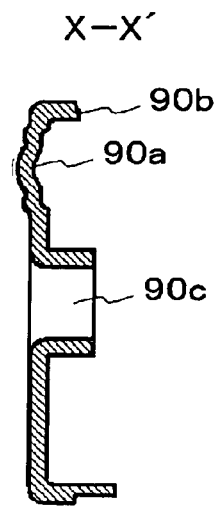
Figure 3:
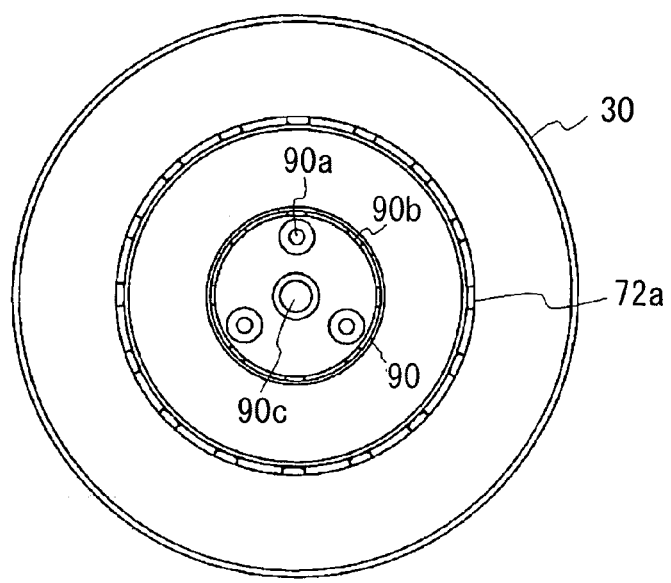
FIG. 3 illustrates a pattern diagram of an assembly of a front cover, the front cover hub and a drum member of the torque converter according to the embodiment of the present invention.
Figure 4A:
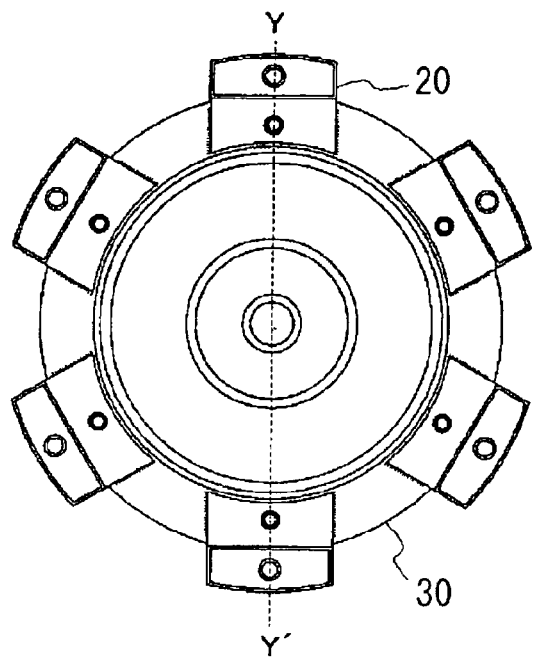
FIG. 4 illustrates a plane view (A) and a cross section along a line Y–Y' (B) of a pattern diagram of an assembly of a set blocks, the front cover, the front cover hub and the drum member of the torque converter according to the embodiment of the present invention.
Figure 4B:
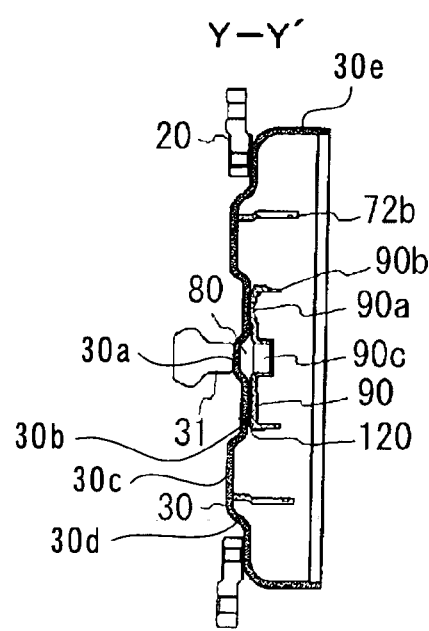

An embodiment of the present invention will be explained hereinbelow referring to attached drawings. FIG. 1 illustrates a cross sectional view of a pattern diagram of a torque converter related to the embodiment of the current invention. FIG. 2A illustrates a plain view simply indicating a front cover hub of the torque converter according to the embodiment of the present invention. FIG. 2 B illustrates a cross sectional view of the front cover hub along a line X–X' in FIG. 2 A. FIG. 3 illustrates a plane view simply indicating an assembling unit including a front cover, the front cover hub and a drum member of the torque converter according to the present invention. FIG. 4 A illustrates an outer plane view simply indicating an assembling unit including set blocks, the front cover, the front cover hub and the drum member. FIG. 4 B illustrates a cross sectional view along Y–Y' line in FIG. 4 A.

As shown in FIG. 1, the torque converter 10 includes the set block 20, the front cover 30, a pump impeller 40, a turbine runner 50, a damper 60, a lock-up clutch 70, an engaging hydraulic pressure chamber 80, the front cover hub 90, a power transmission hydraulic chamber 100, an input shaft 110, an oil path 120, a one-way clutch 130 and a stator 140.

A plurality of the set block 20 is provided along the outer peripheral side of the engaging hydraulic pressure chamber 80 and at the outside of the front cover 30 as shown in FIG. 1 and FIG. 4. A block portion 21 made of a plate is formed at each set block 20 including two arcs whose center point is identical to the center point of the front cover 30. The set blocks 20 are provided in pairs relative to the aforementioned center point, in all three pairs of set blocks 20 are equally spaced on a circumference and welded to the front cover 30 from the inside of the set blocks 20 in FIG. 4 A. Further, a drive plate (not shown) is screwed into each set block 20 with bolts, which is meshed with and driven by a pinion gear of a starter for starting the engine.

A configuration of the front cover 30 connected to the engine (not shown) with the set blocks 20 (FIG. 1 and FIG. 4) will be explained as follows. As shown in the cross sectional view in FIG. 1, the front cover 30 includes a center portion 30a, a front wall (30b, 30c and 30d), a peripheral wall portion 30e and a connecting portion 30f. A center piece 31 whose axis is identical to a crank shaft of the engine is welded to the center portion of the front cover 30. The front wall includes a first depressed portion 30b, a protuberant portion 30c and a second depressed portion 30d. The first depressed portion 30b depressed in the right direction in FIG. 4 B is formed at outer peripheral side of the center portion 30a to be free from a bolt head which is used to fix the drive plate to an edge portion of the crank shaft. The protuberant portion 30c projecting in the left direction in FIG. 4 B is formed at outer peripheral side of the first depressed portion 30b. The second depressed portion 30d is depressed in the right direction in FIG. 4 B to be approximately the same level as the fixing surface of the center piece 31 and formed at an outer peripheral side of the protuberant portion 30c. The set block 20 is attached at the second depressed portion 30d. The peripheral wall portion 30e is extending in axial direction of the input shaft from the most outer peripheral portion of the front wall (30b, 30c and 30d). Further, the inner peripheral diameter of the front cover 30 is increased at the end of the peripheral wall portion 30e to form the connecting portion 30f at which the pump impeller 40 is engaged.

The front cover hub 90 being a ring shape is attached to inside of the front wall of the front cover 30 at the center portion thereof. The front cover hub 90 is fixed to the front wall of the front cover 30 by projection welding from inside thereof at three points on the circumference.

The pump impeller 40 is integrally connected to the front cover 30 as shown in FIG. 1. The pump impeller 40 includes an outer shell 42 at which plural blades 41 are implanted, an impeller hub 43 integrally welded to an inner peripheral of the outer shell 42 and connected to the oil pump gear (not shown) at an end of a shank of the impeller hub 43, and inner core 44 attached at the inner edge of the blades 41.

The turbine runner 50 is provided to be faced to the pump impeller 40 and connected to the input shaft 110 of the transmission (not shown) through the turbine hub 51 (shown in FIG. 1). The turbine runner 50 includes the outer shell 53 having plural blades 52 as the pump impeller 40 has. The turbine runner 50 also includes inner cores 54 attached at the inner edge side of the blades 52. The outer shell 53 is bended and extending inwardly to be connected to the turbine hub 51 along with a driven plate 63 of the damper 60. The turbine hub 51 is engaged with an outer spline of the input shaft at an inner spline of the turbine hub 51 so as to be connected to the input shaft 110.

The damper 60 is provided at outer peripheral of the lock-up clutch 70 (shown in FIG. 1). The damper 60 includes a plurality of damper spring 61 made of coil spring, a drive plate 62 engaged with one side of each damper spring 61 and the driven plate 63 engaged with the other side of each damper spring 61. The drive plate 62 includes a plate 62b for supporting friction discs 62a and a plate 62c having notches for housing the damper springs 61. The drive plate 62 is engaged with an end portion of each damper springs 61. The plate 62b is integrated with the plate 62c by rivet. The driven plate 63 and the outer shell 53 are fixed to the turbine hub 51 by rivet at inner peripheral sides of the driven plate 63 and the outer shell 53. The driven plate 63 including housing portions for housing the damper springs 61 is engaged with the other end of each damper spring 61 relative to the rotating direction of the drive plate 62.

The lock-up clutch 70 is provided inside the front cover 30 to be aligned with a torus portion comprised of the pump impeller 40 and the turbine runner 50 in the shaft direction. The front cover 30 is engagable/disengagable relative to the input shaft 110 through the damper 60. The lock-up clutch 70 includes a piston 71 which is able to be slide in the engaging hydraulic pressure chamber 80 and a clutch engaging portion 72 is engaged/disengaged by the slide of the piston 71.

The piston 71 being a ring shape includes a first groove 71a, spline portions 71b, a second groove 71c, a first protrude portion 71d and a second protrude portion 71e as shown in FIG. 1. The first groove 71a into which a first D ring 74 is fitted is formed on the inner peripheral surface of the piston 71. The spline portions 71b extending inwardly to be inserted into the notch portions 90b of the front cover hub 90 for stopping the rotation of the piston 71. The second groove 71c into which a second D ring 73 is fitted is formed on the outer peripheral surface of the piston 71. The first protrude portion 71d is provided at the inside of the piston 71 to be engagable with friction members 72a of a clutch engaging portion 72. The second protrude portion 71e is provided to be engaged with the front cover 30 at inside thereof to secure a space between the front cover 30 and the piston 71. The first D ring 73 is provided for sealing a space between the piston 71 and the drum member 72b, and the second D ring 74 is provided for sealing a space between the piston 71 and the front cover hub 90.

The clutch engaging portion 72 includes the friction members 72a being alternating layered with the friction discs 62a and the drum member 72b welded to the front cover 30 for supporting the friction members 72a to be slidably.

The engaging hydraulic pressure chamber 80 provided inside the power transmission hydraulic chamber 100 is surrounded by the front cover 30 and the pump impeller 40 so as to be separated from the power transmission hydraulic chamber 100. An engaging hydraulic pressure of the lock-up clutch 70 is provided to the engaging hydraulic pressure chamber 80. The engaging hydraulic pressure chamber 80 is surrounded by the front cover 30, the piston 71, the drum member 72b and the front cover hub 90.

The front cover hub 90 is provided between the front cover 30 and the input shaft 110 (turbine hub 51). The front cover hub 90 includes plural projection portions 90a, notch portions 90b formed at the outer peripheral portion thereof and an opening 90*c*. As shown in FIG. 2A and 2B, the cross sectional shape of the projection portion 90*a* is an arc shape or hemispherical shape. The projection portions 90*a* is formed by stamping to be projecting in the left direction in FIG. 1 in order that the projection portions 90*a* are welded to the front cover 30. The spline portion 71*b* of the piston 71 is fitted and inserted into the notch portions 90*b*. The hydraulic pressure is provided through an oil path of the input shaft 110 into the engaging hydraulic pressure chamber 80 through the opening 90*c* (from FIG. 1 through FIG. 4). The cylindrical inner peripheral surface of the piston 71 is slidable on the outer peripheral surface of the front cover hub 90 in axial direction of the input shaft 110. The front cover hub 90 is welded to the front cover 30 by projection welding at the projection portion 90*a* from the front cover hub 90 side. The process for welding the front cover hub 90 is not limited to the aforementioned means. An electron beam welding may be applied alternatively. A space between the front cover hub 90 and the front cover 30 among of the projection portions 90*a* is an oil path 120.

The stator 14 provided between the pump impeller 40 and the turbine runner 50 is supported by the one-way clutch 130. (shown in FIG. 1)

A lock up engaging pressure or a lock up slip pressure is first provided through an oil path formed inside the input shaft 110, further the pressure is provided into the engaging hydraulic pressure chamber 80 through the oil path 120 formed between the front cover 30 and the front cover hub 90.

In aforementioned configuration, the oil path formed at the front cover hub for providing the hydraulic pressure into the engaging hydraulic pressure chamber can be formed without grinding process, a result, the cost of the torque converter 10 can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque converter, comprising:
    a front cover connected to an engine with a set block;
    a pump impeller integrally connected to the front cover;
    a turbine runner facing to the pump impeller and connected to an input shaft of a transmission;
    a lock-up clutch provided inside the front cover to be in line with a torus portion which is comprised of the pump impeller and the turbine runner in axial direction of the input shaft for engaging/disengaging the front cover relative to the input shaft through a damper;
    an engaging hydraulic pressure chamber separated from a power transmission hydraulic chamber surrounded by the pump impeller and the front cover integrated therewith, and that engaging pressure of the lock-up clutch is provided into the engaging hydraulic pressure chamber;
    a front cover hub provided between the front cover and the input shaft;
    a piston provided at the lock-up clutch and inserted so as to slide in the engaging hydraulic pressure chamber;
    a clutch engaging portion provided at the lock-up clutch and operated to be engaged/disengaged by the piston;
    plural projection portions provided at the front cover hub, formed to be projecting toward the front cover side by stamping, and welded to the front cover, and
    an oil path formed between the front cover and the front cover hub among the projection portions.

2. A torque converter according to claim 1, wherein the projection portions of the front cover hub are welded to the front cover by means of projection welding.

3. A torque converter according to claim 2, wherein the projection welding is applied from the front cover hub side.

4. A torque converter according to claim 3, wherein the front cover hub includes a notch portion at an outer peripheral portion of the front cover hub, and the piston of the lock-up clutch provided along an outer peripheral surface of the front cover hub includes a spline portion at an inner peripheral portion of the piston to be spline engaged with the notch portion of the front cover hub.

5. A torque converter according to claim 4, wherein the clutch engaging portion of the lock-up clutch includes plural friction members supported by a drum member provided at the front cover slidably in axial direction of the input shaft and plural friction discs being alternating layered with the friction members and supported slidably in axial direction of the input shaft by a plate relatively rotatably provided at a turbine hub which is connected to the input shaft of the transmission.

6. A torque converter according to claim 5, wherein the turbine runner is connected to the turbine hub.

7. A torque converter according to claim 6, wherein the plate of the lock-up clutch is connected to the turbine hub through the damper.

8. A torque converter according to claim 5, wherein the piston includes a first groove at an inner peripheral surface of the piston being engaged with the front cover hub, into which a first D-ring is fitted, and a second groove at an outer peripheral surface of the piston being engaged with the drum member provided at the front cover, into which a second D-ring is fitted.

9. A torque converter according to claim 8, wherein the piston includes plural protruding portions being engaged with the clutch engaging portion.

10. A torque converter according to claim 4, wherein the notch portion of the front cover hub opens toward the pump impeller side, and the spline portion of the piston extends inwardly.

11. A torque converter, comprising:
    a front cover connected to an engine;
    a pump impeller provided at the front cover;
    a turbine runner facing to the pump impeller and connected to an input shaft of a transmission;
    a lock-up clutch provided inside the front cover for engaging/disengaging the front cover relative to the input shaft through a damper;
    a front cover hub provided between the front cover and the turbine runner, and forming an engaging hydraulic pressure chamber into which engaging pressure of the lock-up clutch is provided;
    a piston provided at the lock-up clutch and inserted so as to slide in the engaging hydraulic pressure chamber;
    a clutch engaging portion provided at the lock-up clutch and operated to be engaged/disengaged by the piston, and plural hemispherical projection portions provided at the front cover hub, formed to be projecting toward the front cover side by stamping, and welded to the front cover.

12. A torque converter according to claim 11, wherein the projection portions of the front cover hub are welded to the front cover by means of projection welding.

13. A torque converter according to claim 12, wherein the projection welding is applied from the front cover hub side.

14. A torque converter according to claim 13, wherein the front cover hub includes a notch portion at an outer peripheral portion of the front cover hub, and the piston of the lock-up clutch provided along an outer peripheral surface of the front cover hub includes a spline portion at an inner peripheral portion of the piston to be spline engaged with the notch portion of the front cover hub.

15. A torque converter according to claim 14, wherein the clutch engaging portion of the lock-up clutch includes plural friction members supported by a drum member provided at the front cover slidably in axial direction of the input shaft and plural friction discs being alternating layered with the friction members and supported slidably in axial direction of the input shaft by a plate relatively rotatably provided at a turbine hub which is connected to the input shaft of the transmission.

16. A torque converter according to claim 15, wherein the turbine runner is connected to the turbine hub.

17. A torque converter according to claim 16, wherein the plate of the lock-up clutch is connected to the turbine hub through the damper.

18. A torque converter according to claim 15, wherein the piston includes a first groove at an inner peripheral surface of the piston being engaged with the front cover hub, into which a first D-ring is fitted, and a second groove at an outer peripheral surface of the piston being engaged with the drum member provided at the front cover, into which a second D-ring is fitted.

19. A torque converter according to claim 18, wherein the piston includes plural protruding portions being engaged with the clutch engaging portion.

20. A torque converter according to claim 14, wherein the notch portion of the front cover hub opens toward the pump impeller side, and the spline portion of the piston extends inwardly.

21. A torque converter according to claim 1, wherein the plural projection portions are hemispherically shaped in cross section.

22. A torque converter according to claim 11, further comprising an oil path formed between the front cover and the front cover hub among the projection portions.

* * * * *